United States Patent Office 3,655,869
Patented Apr. 11, 1972

3,655,869
TREATMENT OF DIARRHEA EMPLOYING CERTAIN BASIC POLYELECTROLYTE POLYMERS
Ferdinand D. Wharton, St. Louis, John H. Johnson, Kirkwood, Joseph E. Fields, Ballwin, and Lawrence J. Machlin, Olivette, Mo., assignors to Monsanto Company, St. Louis, Mo.
No Drawing. Filed Jan. 2, 1969, Ser. No. 789,080
Int. Cl. A61k 27/00
U.S. Cl. 424—78                                 6 Claims

ABSTRACT OF THE DISCLOSURE

The treatment or prevention of gastro-enteritis diarrheal syndrome (diarrhea) in a living animal body is accomplished by orally administering to said animal body a therapeutically effective amount of a basic polyelectrolyte polymer, which is (A) a polymerized unsaturated carboxylic acid or anhydride and a derivative of a polymerized unsaturated carboxylic acid or anhydride, (B) a derivative of a polymerized unsaturated carboxylic acid or anhydride or (C) a copolymer of (1) an unsaturated monomer having 2 to 18 carbon atoms and (2) a monomer selected from the group consisting of (a) an unsaturated carboxylic acid or anhydride and a derivative of an unsaturated carboxylic acid or anhydride and (b) a derivative of an unsaturated carboxylic acid or anhydride, as exemplified by N,N-dimethylaminopropylimide of ethylene/maleic anhydride copolymer. The basic polymer is polycationic or polyampholytic in nature. Typical dosage is 0.05 to 5.0% of the total diet.

BACKGROUND OF THE INVENTION

Field of the invention

This invention relates to a method for the treatment and prevention of gastro-enteritis diarrheal syndrome (diarrhea) in a living animal body. In a particular aspect this invention relates to a method for the treatment or prevention of diarrhea in a living animal body by orally administering to a living animal body suffering from or subject to a condition likely to lead to diarrhea a therapeutically effective amount of a basic polyelectrolyte polymer selected from the group consisting of (A) a polymerized unsaturated carboxylic acid or anhydride and a derivative of a polymerized unsaturated carboxylic acid or anhydride, (B) a derivative of a polymerized unsaturated carboxylic acid or anhydride and (C) a copolymer of (1) an unsaturated monomer having 2 to 18 carbon atoms, for example alkene, phenylalkene and alkoxyalkene and (2) a monomer selected from the group consisting of (a) an unsaturated carboxylic acid or anhydride and a derivative of an unsaturated carboxylic acid or anhydride and (b) a derivative of an unsaturated carboxylic acid or anhydride said polymer containing basic or cationic groups and being polycationic or polyampholytic in nature.

DESCRIPTION OF THE PRIOR ART

Gastro-enteritis-diarrheal syndromes (diarrhea) manifest their presence as a variety of gastro-intestinal upsets and diseases which continue to plague living animal bodies. It is known that various organisms including those of the Staphylococcus, Clostridium, Coli and Pseudomonas genera are among the causes of diarrhea in living animal bodies including warm-blooded vertebrate animals such as chickens, dogs, swine, cattle, cats and primates, for example, monkeys. Many cures have been suggested for diarrhea, some good and some indifferent and include the use of various orally administered medicaments. Efficacy of some of these is in part attributable to control of microbial growth and related toxin production. For example, organic resins have been used in the treatment of diarrhea and such resins include anionic copolymers of an olefin and maleic anhydride (U.S. Pat. 3,224,941).

SUMMARY OF THE INVENTION

The present invention resides in the discovery that gastro-enteritis diarrheal syndrome (diarrhea) is effectively treated or prevented in a living animal body by orally administering to said animal body a therapeutically effective amount of a basic polyelectrolyte polymer selected from the group consisting of (A) a polymerized unsaturated carboxylic acid or anhydride and a derivative of a polymerized unsaturated carboxylic acid or anhydride (B) a derivative of a polymerized unsaturated carboxylic acid or anhydride and (C) a copolymer of (1) an unsaturated monomer having 2 to 18 carbon atoms and (2) a monomer selected from the group consisting of (a) an unsaturated carboxylic acid or anhydride and a derivative of an unsaturated carboxylic acid or anhydride and (b) a derivative of an unsaturated carboxylic acid or anhydride said polymer containing basic or cationic groups and being polycationic or polyampholytic in nature. The method of the present invention provides the art with an important improvement in the treatment or prevention of diarrhea in that the results obtained therewith are decidedly superior to the results obtained with polyanionic olefin-maleic anhydride copolymers previously employed.

DETAILED DESCRIPTION

The polymer can be orally administered to the living animal body by any suitable means and in any suitable form, for example, the polymer can be incorporated into ordinary foodstuffs and beverages containing nutritional values in an amount sufficient to produce the desired result. Also, the polymer can be incorporated into a pharmaceutical composition of the form customarily employed for oral administration. Pharmaceutical compositions containing the polymer can be in liquid form, for example, a solution or suspension specifically adapted for oral administration or in solid form, for example, in tablet, capsule, pill or packaged powder. Advantageously the pharmaceutical composition containing the polymer can be prepared in unit dosage form using pharmacautically acceptable carriers, such as for example, starch, glucose, lactose, gelatin, sucrose, etc. and the like. If desired the dosage unit can be made up in a sustained release to give a controlled dosage over an extended period of time. Other medicaments may also be included in the pharmaceutical composition if desired.

The amount or dosage of polymer administered to the living animal body will, of course, vary depending among other things on the size of the living animal body, the particular living animal body to be treated, the seriousness of the disease, and the general health of the living animal body and any pharmaceutically effective amount may be employed. The dosage can be determined with regard to established medical practice. Generally, the amount of polymer administered is equal to about 0.05 to about 5.0% by weight of daily food intake. Preferably the amount administered will be in the range of from about 0.5 to about 3.0%.

The polymer of use in the present invention may be water-soluble or water-insoluble with water-insoluble polymers being preferred. Many of the normally water-soluble polymers are converted to the water-insoluble form by introduction of sufficient crosslinks in the known manner. Crosslinking may be accomplished either during the preparation of the polymer or by subsequent treatment of the polymer to make the polymer insoluble in water. The water-insolubility of the polymer can be varied by regulation of the degree of crosslinking of the polymer. The term "water-insoluble" as used herein is taken to mean that the polymer concerned does not dissolve in water or aqueous solution even though it may have such characteristics as a high degree of swelling due to solvation by water even to the extent of existence in a gel form. Such characteristics are typically imparted by crosslinking.

As previously indicated, the basic polyelectrolyte polymers employed in the method of the present invention are polymeric polyelectrolytes selected from the group consisting of (A) a polymerized unsaturated carboxylic acid or anhydride and a derivative of a polymerized unsaturated carboxylic acid or anhydride (B) a derivative of a polymerized unsaturated carboxylic acid or anhydride and, (C) a copolymer of (1) an unsaturated monomer having 2 to 18 carbon atoms and (2) a monomer selected from the group consisting of (a) an unsaturated carboxylic acid or anhydride and a derivative of an unsaturated carboxylic acid or anhydride and (b) a derivative of an unsaturated carboxylic acid or anhydride said polymer containing basic or cationic groups and being polycationic or polyampholytic in nature. Preferably the basic polyelectrolyte polymer has an average molecular weight of at least 1,000 and a degree of polymerization of at least 8.

By "polyelectrolyte" it is intended to include only polymeric organic substances which when contacted with an aqueous medium or aqueous alkaline or aqueous acidic medium possess organic ions having electrical charges distributed at a plurality of positions thereon.

It is understood that, according to, and for the purposes of the present invention, in order to achieve the desired basic or cationic character a substantial number (e.g. about 5–100% and preferably about 30–100%) of the polymer units as hereinafter defined include basic or cationic groups.

The initial polymer modified when necessary to comply with requirements for basic groups may advantageously be an EMA-type polymer.

Among the EMA-type polymers suitable for the practice of the instant invention subject to the previously noted requirements are polymeric polyelectrolytes having units of the formula

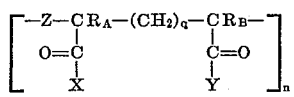

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, alkoxyalkylene, and aliphatic acyloxyalkylene) of 1 to 18 carbon atoms, preferably a bivalent carbon chain of 1 to 4 carbon atoms inclusive, which is a part of a unit containing 1–18 carbon atoms, inclusive, $q$ is zero or one, X and Y are selected from hydroxy, —O alkali metal, OR, —OH—$NH_3$, —OH—$R_3N$, —OH—$R_2NH$, —OH—$RNH_2$, —NRR′, —$(Q)_p$—W—$(NR'R')_x$ and —$(Q)_p$—W—$(-OH)_x$, wherein $x$ is 1 to 4 and $p$ is zero or one, wherein R is selected from the group consisting of alkyl, phenylalkyl, or phenyl, in each case of 1 to 18 carbon atoms, wherein R′ is H or R, wherein Q is oxygen or —NR′—, and wherein W is a bivalent radical preferably selected from alkylene, phenylene and phenylalkene having up to 20 carbon atoms, X and Y taken together can be oxygen or —NR—, —N—W—$(NR'R')_x$ or

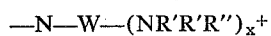

wherein R, W, R′, have the meanings previously assigned and R″ is alkyl of 1 to 18 carbon atoms, benzyl or aromatic-substituted benzyl. The units of the formula given above are recurring $n$ being at least 8 and can be as much as 100,000 degrees of polymerization. When the units are recurring the symbols in the various recurring units do not necessarily stand for the same thing in all of the recurring units.

Many of these polymers suitable for the practice of the present invention or suitable after conversion to derivatives are commercially available. Such polymers containing the requisite basic or cationic groups are hereinafter sometimes referred to as basic EMA-type polymers.

The polycarboxylic acid polymers can be of the non-vicinal-type including those containing monomer units, such as acrylic acid, acrylic anhydride, methacrylic acid, crotonic acid or their respective derivatives, including partial salts, amides and esters or of the vicinal type, including maleic, itaconic, citraconic, a-dimethyl maleic, a-butyl maleic, a-phenyl maleic, fumaric, aconitic, a-chloromaleic, a-bromomaleic, a-cyanomaleic acids including their salts, amides and esters. Anhydrides of the foregoing acids are also advantageously employed.

Comonomers suitable for use with the above polycarboxylic acid monomers include a-olefins, such as ethylene, 2-methyl-pentene-1, propylene, butylene, 1- or 2-butene, 1-hexene, 1-octene, 1-decene, 1-dodecene, 1-octadecene, and other vinyl monomers, such as styrene, a-methyl, styrene, vinyltoluene, vinyl acetate, vinyl chloride, vinyl formate, vinyl alkyl ethers, e.g. methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said carboxylic acids or derivatives, may be copolymerized with any of the other monomers described above, and any other monomer which forms a copolymer with carboxylic acids or derivatives. Although these copolymers can be prepared by direct polymerization of the various monomers, frequently they are more easily prepared by an after-reaction modification of an existing copolymer. Copolymers are conveniently identified in terms of their monomeric constituents. The names so applied refer to the molecular structure and are not limited to the polymers prepared by the copolymerization of the specified monomers.

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the alkyl or other esters and amides, alkyl amides, dialkyl amides, phenylalkyl amides or phenyl amides prepared by reacting carboxyl groups on the polymer chain with the selected amines or alkyl or phenylalkyl alcohol, as well as amino esters, amino amides, hydroxy amides and hydroxy esters, wherein the functional groups are separated by alkylene, phenyl, phenylalkyl, phenylalkylphenyl, or alkylphenylalkyl or other aryl groups. Moieties bearing amine or amine salts including quaternary salt groups are conveniently formed by reaction of the carboxyls of their anhydride precursors, where applicable with polyfunctional amines such as dimethylaminopropylamine or dialkylamino-alcohols such as dimethylaminoethanol, the former forming an amide linkage with the polymer, or in certain cases at higher temperatures forming an imide linkage with vicinal carboxyls, and the latter forming an ester linkage. Such pendant free amine groups can then be converted, if desired, to their simple or quaternary salts. Particularly preferred derivatives are diloweralkylamino-loweralkylamides.

Basic EMA-type polymers include derivatives of the following classes of polymers: ethylene/maleic anhydride copolymers, isobutylene/maleic anhydride copolymers, 2-methylpentene-1/maleic anhydride copolymers, styrene/maleic anhydride copolymers, vinyl alkyl ether/maleic anhydride copolymers, vinylacetate/maleic anhydride copolymers, a-methylstyrene/maleic anhydride copolymers, a-polymaleic anhydride polymers, polyacrylic anhydride polymers, polyacrylic acid polymers, and polymethacrylic acid polymers.

Individual examples of basic polyelectrolyte polymers useful in the present invention include N,N-dimethylaminopropylimide of ethylene/maleic anhydride copolymer, N, N-dimethylaminopropylimide of styrene/maleic anhydride copolymer, N,N-dimethylaminopropylimide of 2-methyl-pentene-1/maleic anhydride copolymer, the half N,N-dimethylaminoethylamide half ammonium salt of isobutylene/maleic anhydride copolymer, dimethylaminopropylamide acid of divinylether/maleic anhydride copolymer, half isobutylamide half dimethylaminoethylester of vinyl acetate/maleic anhydride copolymer, methiodide quaternary of N,N-dimethylaminoethylamide of polymaleic anhydride, diethylaminoethyl half amide of hexene-1/chloromaleic anhydride copolymer, N,N-dipropylaminopropylamide ammonium salt of isobutylene/itaconic anhydride copolymer, dimethyl sulfate quaternary salt of dimethylaminoethylamide of polymaleic anhydride, the partial half dimethylaminoethylamide of vinylmethylether/citraconic anhydride copolymer, N,N-dimethylaminopropyl monoamide of styrene/maleic anhydride copolymer, N,N-dimethylaminopropyl monoamide of styrene/citraconic anhydride copolymer, N,N-diethylmonoamide ammonium salt of vinyl acetate/maleic anhydride copolymer, dimethylsulfate quaternary salt of diethylaminopropylimide of divinylether/maleic anhydride copolymer, N,N-dimethylaminopropyl half amide of paramethyl styrene/maleic anhydride copolymer, methyliodide quaternary salt of dimethylaminohexyl half amide half ammonium salt of a-methylstyrene/maleic anhydride copolymer, N,N-diethylaminoethyl half amide half sodium salt of isobutylene/maleic anhydride copolymer, and stearyl methacrylate/N,N-dimethylaminoethyl methacrylate copolymer.

Representative EMA-type carboxylic acid or anhydride-olefin polymers, especially maleic acid or anhydride-olefin polymers of the foregoing type are known, for example, from U.S. Pats. 2,378,629; 2,396,785; 3,157,595; and 3,340,680. Generally, the copolymers are prepared by reacting ethylene or other unsaturated monomer, or mixtures thereof, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 100,000 preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. Numerous of these polymers are commercially available.

Derivatives containing requisite basic or cationic groups can be prepared by any convenient procedure. Representative derivatives of polymers employed in the present invention are known to the art, for example, from U.S. Pat. 3,398,092. One group of useful derivatives are those in which the carboxyl groups are partially replaced with basic or cationic bearing moieties. For example, useful derivatives are conveniently formed by reaction of the carboxyls with polyfunctional amines such as dimethylaminopropylamine or dialkylaminoalcohols such as dimethylaminoethanol, the former forming an amide linkage with the polymer, or in certain cases at higher temperatures forming an imide linkage with the vicinal carboxyls and the latter forming an ester linkage. Such pendant free amine groups can then be converted, if desired, to their simple or quaternary salts.

Further, as already indicated for the polymers employed to have the desired basic or cationic character a substantial number (e.g. about 5–100%) of the polymer units contain basic or cationic groups. Such products are further illustrated by the following general examples.

Partial imides of a starting carboxyl or carboxylic acid anhydride containing polymer, e.g., EMA, are produced by:

(A) Heating a limiting amount of a secondary or tertiary aminoloweralkylamine with the anhydride or carboxyl-containing form of the polymer in a suitable solvent (e.g. xylene) at a temperature of about 140–150° C. until water is no longer given off. Such a reaction simultaneously results in formation of imide groups in proportion to the amount of amine added and in the reformation of anhydride groups for the remainder of the polymer units. In this manner, imide-polymer products are formed which possess 5–100% imide linkages, the remaining carboxyl groups, when present, being in the anhydride form.

(B) Alternatively, a partial amide-polymer product may be converted to the partial imide polymer product by heating a partial amide-polymer product in vacuo at 140–150° C. until water is no longer given off. Such an imide polymer product likewise possesses comparable proportions of imide and anhydride groups depending upon the number of amide groups originally contained in the starting partial amide-polymer product.

Partial secondary or tertiary aminoloweralkylamides of the starting carbonyl or carboxylic acid anhydride-containing polymer, e.g., EMA, are obtained by contacting the polymer with a limiting amount of the selected amine in suspension in a solvent such as benzene or hexane, resulting in formation of a partial amide-acid-anhydride derivative of the polymer, or a corresponding amide-carboxylate derivative thereof. The number of amide groups is dependent upon the quantity of the amine used as compared with the quantity of polymer employed. Such amide-polymer products comprise 5–100% amide groups, with remaining carboxyl groups being present as acid or anhydride groups.

Partial aminoester-polymer products are most conveniently prepared by heating at reflux temperatures overnight a limiting quantity of the selected aminoalcohol and carboxyl or carboxylic acid anhydride containing polymer, e.g., EMA, in a dry organic solvent such as toluene or dimethylformamide and with the optional use of an acidic or basic catalyst such as p-toluenesulfonic acid or sodium alkoxide. The resulting product contains ester groups, carboxylic acid groups and anhydride groups, the respective numbers of which are determined by the quantity of aminoalcohol used in the reaction compared to the amount of polymer employed and, in some cases, by the temperature at which the reaction is carried out.

Suitable blocking and unblocking of the amine moiety of the reactant employed in preparing amides, esters or imides may be effected when required. Residual, non-modified, polymer units may optionally be converted to neutral groups or units by attachment to the polymer molecule of compounds including alkylamines, aminoalcohols, and alcohols.

Alternatively, the cationic character of the polymer can be provided through incorporation of monomers which impart a basic or cationic character such as C-vinyl pyridines, vinyl amine, the several amino-substituted vinyl benzenes (or toluenes, etc.), amine-bearing acrylates (or methacrylates, etc.), vinyl imidazole, etc.

Thus, in any event, the polymer product will have residual active or reactive groups which may be of various types, but these residual active or reactive groups or residual "reactive sites" in the polymer will in one way or another comprise a certain percentage, about 5–100%, preferably about 30–100%, which are of a basic or cationic nature, so as to impart the requisite basic or cationic nature to the polymer product.

The invention will be understood more fully by reference to the following specific examples. It is understood that the examples are presented for the purpose of illustration only and are not intended as a limitation of the invention.

EXAMPLE 1

The anti-bacterial activity of crosslinked water-insoluble basic EMA-type copolymers was determined against the organisms *Pseudomonas aeruginosa* and *Staphylococcus aureus* as follows:

Copolymer was placed in a sterile, capped 25 ml. Erlenmeyer flask. Five ml. of bacterial culture containing $10^4$–$10^5$ organisms per ml. were added to the flask. The flask was placed on a rotary shaker at 37° C. for one hour. The resulting suspension was filtered through sterile filter paper to remove the copolymer and adsorbed bacteria. One ml. of the filtrate was placed on a culture plate and liquid nutrient agar was added thereto with mixing. The agar was allowed to solidify. The plate was then incubated at 37° C. and the number of colonies was determined after 48 hours. In the test with the organism *Pseudomonas aeruginosa* 10 mg. of copolymer was employed. In the test with the organism *Staphylococcus aureus* 1 mg. of copolymer was employed. For comparative purposes the exact procedure was repeated using crosslinked water-insoluble anionic EMA-type copolymers. The results of the test are shown in Table 1 below. In the table a lower number of colonies represents a greater adsorption of bacteria by the copolymer. The amount of derivative in the copolymer is indicated as a percent in the table.

The results of this test show the effectiveness of basic EMA-type polymers in the adsorption of bacteria. The test further shows the superiority of basic EMA-type polymers over anionic EMA-type polymers in the adsorption of bacteria.

EXAMPLES 2 THRU 5

Controlled diets were fed to duplicate groups of 6 each Columbian male chicks. Inclusion of 3.0% by weight of the diet (Basal Diet shown below) of basic EMA-type polymers was studied to observe health with a 3-week growth period being examined. Feed efficiency was noted and is reported in Table 2. All chicks were in good health and generally exhibited acceptable feed efficiency. The copolymers of Examples 2–4 are linear while the copolymer of Example 5 is crosslinked.

Basal diet

| Ingredient: | Percent by weight |
|---|---|
| Soybean meal | 25.00 |
| Whole egg (powder) | 25.00 |
| Vitamin supplement | 0.40 |
| Choline chloride | 0.14 |
| Iodized salt | 0.05 |
| Delamix | 0.10 |
| Dicalcium phosphate | 2.00 |
| Calcium carbonate | 1.00 |
| Vitamin A (10,000 u./g.) | 0.10 |
| Vitamin D (1,500 u./g.) | 0.008 |
| Alpha cel | 3.00 |
| Cerelose | 42.752 |

TABLE 1

| Polymer | Percent | Number of colonies *Staphylococcus aureus* | Number of colonies *Pseudomonas aeruginosa* |
|---|---|---|---|
| Ethylene/maleic anhydride (anionic) | 0 | $10^3$ | $10^4$ |
| N,N-dimethylaminopropylimide of ethylene/maleic anhydride | 5 | $10^3$ | 3 |
|  | 10 | $10^3$ | 0 |
|  | 30 | 14 | 0 |
|  | 70 | 0–99 | 0 |
|  | 100 | 0–99 | 0 |
| Styrene/maleic anhydride (anionic) | 0 | $10^4$ | $10^4$ |
| N,N-dimethylaminopropylimide of styrene/maleic anhydride | 5 | $10^4$ | $10^4$ |
|  | 10 | $10^4$ | $10^3$ |
|  | 30 | 80 | 76 |
|  | 70 | 66 | 0 |
|  | 100 | 22 | 0 |
| Isobutylene/maleic anhydride (anionic) | 0 | $10^3$ | $10^2$ |
| N,N-dimethylaminopropylimide of isobutylene/maleic anhydride | 5 | $10^2$ | 71 |
|  | 10 | 82 | 27 |
|  | 30 | 0 | 0 |
|  | 70 | 0 | 0 |
|  | 100 | 0 | 0 |
| 2-methyl-pentene-1/maleic anhydride (anionic) | 0 | $10^4$ | 74 |
| N,N-dimethylaminopropylimide of 2-methyl-pentene-1/maleic anhydride | 5 | $10^4$ | $10^2$ |
|  | 10 | $10^4$ | $10^2$ |
|  | 30 | 96 | 19 |
|  | 70 | 66 | 1 |
|  | 100 | 43 | 5 |

TABLE 2

| Example No. |  | Level in feed | Feed efficiency, g. feed/ g. chick weight |
|---|---|---|---|
| (Control) | None | | 1.19 |
| 2 | N,N-dimethylaminopropylimide of octadecene-1/maleic anhydride copolymer. | 3.0 | 1.24 |
| 3 | Stearylmethacrylate/methacrylamide copolymer. | 3.0 | 1.25 |
| 4 | Stearylmethacrylate/N,N-dimethylaminoethylmethacrylate copolymer. | 3.0 | 1.37 |
| 5 | N,N-dimethylaminopropylimide of styrene/maleic anhydride copolymer. | 3.0 | 1.56 |

EXAMPLE 6

Six calves suffering from diarrhea (scours), are fed a daily ration containing from 0.5 to 3.0% of crosslinked N,N-dimethylaminopropylimide derivative of ethylene/maleic anhydride copolymer. The condition of diarrhea is alleviated and the appetite and general well being of the calves are improved.

EXAMPLE 7

Six chimpanzee suffering from diarrhea are fed a daily ration containing 0.5 to 3.0% of crosslinked N,N-dimethylaminopropylimide derivative of ethylene/maleic anhydride copolymer (60% derivative) and the condition of diarrhea is alleviated.

Representative formulations embodying basic EMA-type copolymers within the scope of the present invention are:

Tablet formulation

The following formulation provides for the manufacture of 1,000 tablets:

| | Grams |
|---|---|
| (1) N,N-dimethylaminopropylimide of styrene/maleic anhydride copolymer (crosslinked) | 25 |
| (2) Lactose | 181 |
| (3) Corn starch | 92 |
| (4) Magnesium stearate | 2 |

Thoroughly granulate a mixture of 72 grams of cornstarch and the lactose with a paste prepared by dissolving 20 grams of cornstarch in 100 ml. of hot distilled water. Dry the resulting granulation at 40–45° C. and pass it through a No. 16-mesh screen. To the dried, screened granulation add a blended mixture of the active ingredient (1) and the magnesium stearate. Thoroughly blend and then press into tablets of 300 mg. each.

Capsule formulation

The following formulation provides for the manufacture of 1,000 capsules:

| | Grams |
|---|---|
| (1) N,N-dimethylaminopropylimide of octadecene-1/maleic anhydride copolymer (crosslinked) | 25 |
| (2) Lactose | 274 |
| (3) Magnesium stearate | 2 |

Mix active ingredient (1) with the lactose and blend in the magnesium stearate. Fill hard gelatin capsules with 300 mg. each of the blended mixture to produce capsules containing the active ingredient.

Since many embodiments of this invention may be made, and since many changes may be made in the embodiments described, the foregoing is to be interpreted as illustrative only and the invention is defined by the claims appended hereto.

What is claimed is:

1. A method for the treatment of gastro-enteritis diarrheal syndrome in a living animal body which comprises orally administering to a living animal body suffering from gastro-enteritis diarrheal syndrome a therapeutically effective amount of a substantially equimolar copolymer of ethylene and maleic acid or anhydride, said copolymer containing about 5 to 100% diloweralkylaminoloweralkylimide groups and having a degree of polymerization of from about 8 to about 100,000.

2. The method of claim 1 wherein said copolymer contains from about 30 to 100% diloweralkylaminoloweralkylimide groups.

3. A method for the treatment of gastro-enteritis diarrheal syndrome in a living animal body which comprises orally administering to a living animal body suffering from gastro-enteritis diarrheal syndrome a therapeutically effective amount of a substantially equimolar copolymer of styrene and maleic acid or anhydride, said copolymer containing about 5 to 100% diloweralkylaminoloweralkylimide groups and having a degree of polymerization of from about 8 to about 100,000.

4. A method for the treatment of gastro-enteritis diarrheal syndrome in a living animal body which comprises orally administering to a living animal body suffering from gastro-enteritis diarrheal syndrome a therapeutically effective amount of a substantially equimolar copolymer of isobutylene and maleic acid or anhydride, said copolymer containing about 5 to 100% diloweralkylaminoloweralkylimide groups and having a degree of polymerization from about 8 to about 100,000.

5. A method for the treatment of gastro-enteritis diarrheal syndrome in a living animal body which comprises orally administering to a living animal body suffering from gastro-enteritis diarrheal syndrome a therapeutically effective amount of a substantially equimolar copolymer of 2-methyl-pentene-1 and maleic acid or anhydride, said copolymer containing about 5 to 100% diloweralkylaminoloweralkylimide groups and having a degree of polymerization of from about 8 to about 100,000.

6. A method for the treatment of gastro-enteritis diarrheal syndrome in a living animal body which comprises orally administering to a living animal body suffering from gastro-enteritis diarrheal syndrome a therapeutically effective amount of a substantially equimolar copolymer of octadecene and maleic acid or anhydride, said copolymer containing about 5 to 100% diloweralkylaminoloweralkylimide groups and having a degree of polymerization of from about 8 to about 100,000.

References Cited

UNITED STATES PATENTS

| | | | |
|---|---|---|---|
| 3,157,595 | 11/1964 | Johnson et al. | 260—89.7 N |
| 3,224,941 | 12/1965 | Nash et al. | 424—78 |

SAM ROSEN, Primary Examiner

V. D. TURNER, Assistant Examiner

U.S. Cl. X.R.

424—81